United States Patent [19]

Harris

[11] Patent Number: 4,560,272

[45] Date of Patent: Dec. 24, 1985

[54] THREE-AXIS ANGLE SENSOR

[75] Inventor: Michael D. Harris, Easton, Conn.

[73] Assignee: The Perkin-Elmer Corporation, Norwalk, Conn.

[21] Appl. No.: 646,547

[22] Filed: Sep. 4, 1984

Related U.S. Application Data

[63] Continuation of Ser. No. 329,380, Dec. 10, 1980.

[51] Int. Cl.$^4$ ............................................. G01B 11/27
[52] U.S. Cl. ...................................... 356/138; 356/153; 356/364
[58] Field of Search ............... 356/138, 153, 364, 366, 356/367, 370, 33, 34; 350/407

[56] References Cited

U.S. PATENT DOCUMENTS

| | | | |
|---|---|---|---|
| 2,029,170 | 1/1936 | Hull | 356/364 |
| 2,450,761 | 10/1948 | MacNeille | 356/364 |
| 3,480,367 | 11/1969 | Husted et al. | 356/138 |
| 3,804,522 | 4/1974 | Smith | 350/407 |
| 3,871,771 | 3/1975 | Scott | 356/152 |
| 3,932,039 | 1/1976 | Frey . | |

FOREIGN PATENT DOCUMENTS

| | | | |
|---|---|---|---|
| 37938 | 3/1980 | Japan | 356/138 |
| 408174 | 6/1977 | U.S.S.R. | 356/33 |

*Primary Examiner*—R. A. Rosenberger
*Attorney, Agent, or Firm*—Thomas P. Murphy; Richard C. Wilder; Edwin T. Grimes

[57] ABSTRACT

An optical sensor comprises a device for monitoring the angular motion of a remote body about three orthogonal axes from a single observation point. A compact totally passive target is adapted to be attached to the body, the angular motion of which is to be sensed. The target reflects light beams representing pitch, yaw and roll measurement functions. The reflected light beams are optically sensed and reduced to components about the pitch, yaw and roll axes which are visually displayed through a single eyepiece.

6 Claims, 8 Drawing Figures

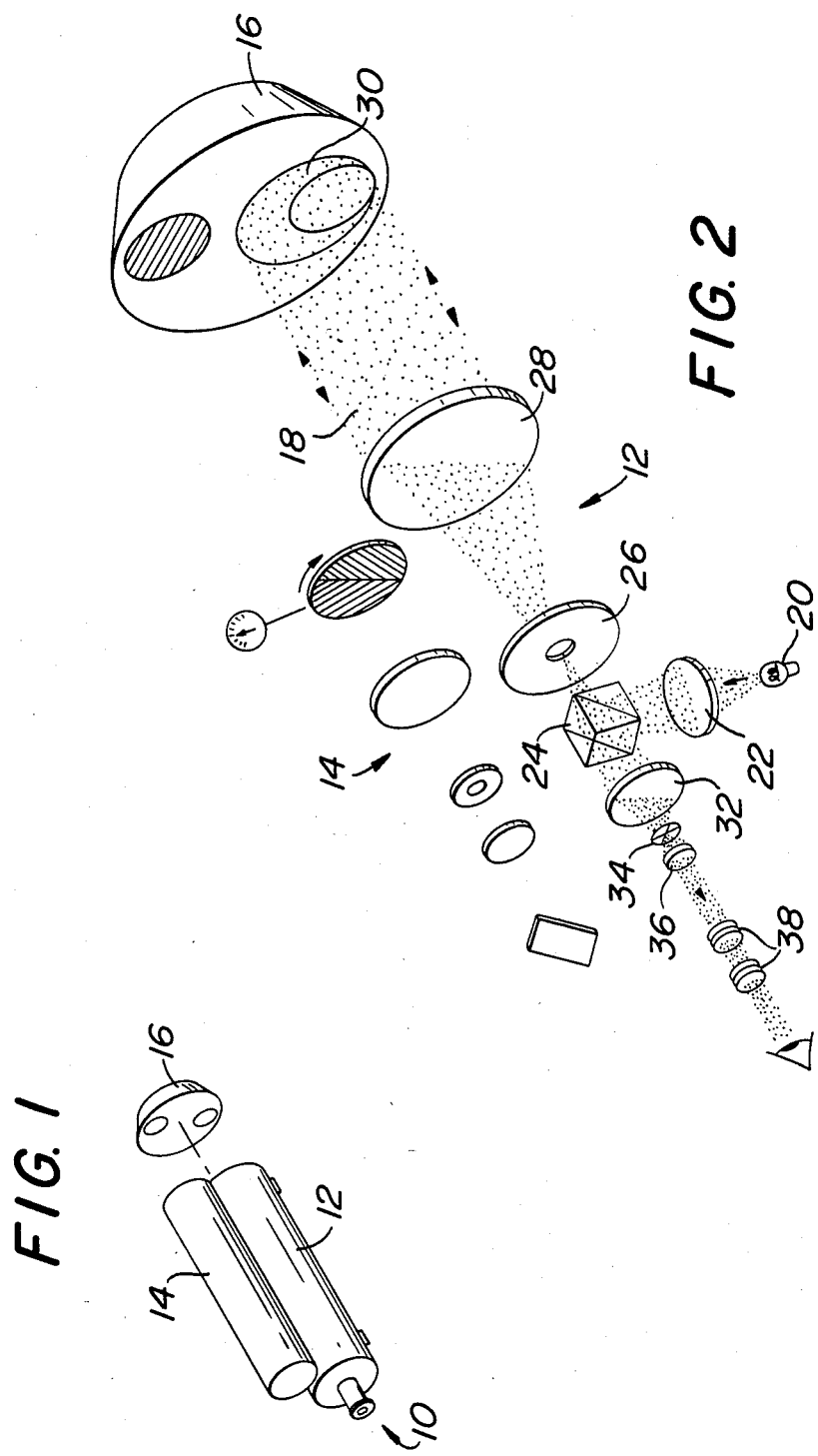

THREE-AXIS ANGLE SENSOR

This application is a continuation of application Ser. No. 329,380, filed Dec. 10, 1980.

BACKGROUND OF THE INVENTION

Numerous systems have been used in the past to detect angular motions of a remote body or object. Such systems have, for example, been used in helicopter alignment bore sight systems.

Many systems used heretofore for detecting pitch, yaw and roll of a remote object have been relatively cumbersome, complex and have required a large number of parts to measure all three functions. They have also been relatively costly and have required electrical connections at the remote object to produce or read out the angular data.

In general, in past systems involving three axis measurements of a remote object, separate means have been employed for detecting and observing the three different measurements.

OBJECTS OF THE INVENTION

It is an object of this invention to provide an improved device for monitoring the angular motion of a remote body about three orthogonal axes from a single observation point.

It is a further object of this invention to provide an improved means for monitoring the angular motion of a remote body wherein no signal processing is required.

It is still a further object of this invention to provide an improved optical system for monitoring the angular motion of a remote body by use of relatively compact units.

It is still a further object of this invention to provide an improved optical system for monitoring the angular motion of a remote body and which includes compact devices requiring no electrical or other connections at the remote body and in which the operation of the system is simple, rapid and easily learned.

BRIEF SUMMARY OF THE INVENTION

In accordance with the present invention, a three axis optical sensor is provided. A transceiver including an autocollimator and polarimeter is employed to transmit and receive a beam of light signals through a first path to a target device which is adapted to be attached to a remote object, the angular motion of which is to be sensed. The target device receives and reflects the light signals. The target device includes a first surface to reflect the light signals directly back to the transceiver, where they are used to detect the pitch and yaw variations in the object to which the target device is attached. Some of the transmitted beam of light signals from the transceiver are not directly reflected and pass through prism means in the target device and are reflected along a second path to the transceiver, where they are used to detect roll variations in the object to which the target device is attached. A single viewing means is employed to detect and measure variations in all three axes.

Other objects and advantages of the present invention will be apparent and suggest themselves to those skilled in the art, from a reading of the following specification and claims, taken in conjunction with the accompanying drawing.

BRIEF DESCRIPTION OF THE DRAWINGS

FIG. 1 is a general representation of a transceiver and target device which comprise the three axis sensor, in accordance with the present invention;

FIG. 2 is an exploded view illustrating the main components of the transceiver and target device illustrated in FIG. 1, in which the path of a first light beam is emphasized to aid in describing the pitch and yaw measurement functions;

DETAILED DESCRIPTION OF THE INVENTION

Figure 3:
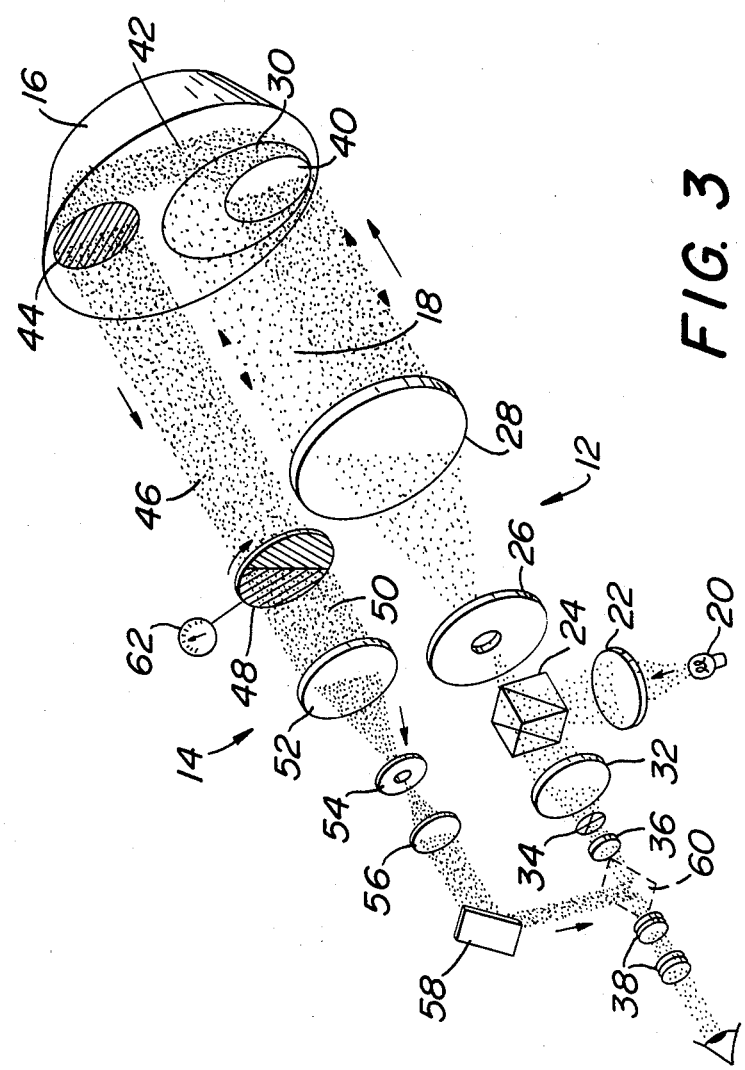
FIG. 3 is an exploded view similar to FIG. 2 in which a second light beam is emphasized, along with the first light beam of FIG. 2, to aid in describing the roll measurement function.

In describing the present invention, two basic operations will be described separately. The first operation relates to the means for detecting and measuring the pitch and yaw functions of a remote body. The second operation relates to the means for detecting and measuring the roll function of the remote body. While the operations will be described separately, many of the parts used for both operations are the same. The overall result is the provision of a small relatively compact device which is capable of detecting the movement of a remote object about three orthogonal axes to detect and measure its relative pitch, yaw and roll movements.

Referring to FIG. 1, a transceiver 10 comprises an autocollimator 12 and a polarimeter 14. The transceiver 10 is used to transmit and receive beams of light signals to and from a target device or module 16, which is adapted to be attached to a remote body, the movements of which are to be detected.

As will be described, the autocollimator 12 is used to detect the pitch and yaw motions of the target device 16. The polarimeter 14, on the other hand, is used to detect the roll motion (i.e., rotation about the line of sight) of the target device 16.

The target device 16 is a totally passive target to which no electrical connections of any kind are required. The target device comprises a corner-cube prism which may, for example, be roughly three inches in diameter, with its rear corner removed and its front face coated in a manner to be described. The use of the type of target device 16 to be described effectively eliminates interaction effects between the autocollimator and polarimeter channels.

Basically, the configuration to be described with respect to the pitch and yaw sensing utilizes a tried and true technique of autocollimation. The autocollimator beam compatibly couples into a visual polarimeter deriving its source energy from a portion of the autocollimator beam to produce signals capable of being used to sense the roll of a remote body. Only a single passage of the beam through the polarizing elements in the polarimeter is required, thus minimizing energy losses in the channel.

The operation relating to the pitch and yaw sensing function will first be described in connection with FIG. 2. Referring to FIG. 2, a beam of light 18 is projected from the autocollimator 12 to the target device 16. The target device is adapted to be attached by any suitable means to a remote body (not illustrated). The light from the target device 16 is reflected back to the autocollimator 12.

A light source for generating the beam 18 comprises a tungsten light bulb 20, which may be operated by a battery or other suitable electrical means at the fixed station at which the transceiver 10 is generally installed. The light from the bulb 20 is transmitted through a condensor lens 22 to a beam splitter 24. The light from the beam splitter 24 is deflected through an opening in a field stop member 26 to an autocollimator objective 28.

The light beam 18 from the autocollimator objective 28 travels through space out to the target device 16, where it is reflected from a silvered portion 30 on the front face of the corner cube or target device 16. The reflected light from the silvered portion 30 is returned to the autocollimator objective 28, through the field stop member 26, through the beam splitter 24 to a lens 32. The light from the lens 32 passes through a reticle 34 to a second lens 36. The light from the second lens 36 passes through an eyepiece 38 which may comprise at least two elements, where the reflected light may be viewed by an observer.

If the target device 16 is inclined upwardly or downwardly, the light reflected back from the surface 30 will indicate a relative change in the pitch of the target device 16 and the body to which it is attached. The change in direction of the reflected beam of light may be viewed by an observer as a change upward or downward from a standard or normal image position on the reticle 34.

In like manner, if the target device 16 deviates or moves about its vertical axis, or oscillates from left to right, it indicates that yaw is taking place. Under these circumstances, the reflected beam of light 18 transmitted to the reticle 34 and viewed by an observer will appear as an image to the left or right of a fixed reference point on the reticle 34.

The pitch and yaw variations may be read out by an observer as displacements of the returned image from the center of the fixed reticle 34. The fixed reticle 34 may involve a "go-no-go" reticle configuration to inform an operator as to whether the observed error exceeds a required specification, or may utilize a crosshatched measurement pattern, or both.

The various autocollimation techniques described is standard. Various details relating to reticles and other elements illustrated are well known to those skilled in the art and will not be elaborated upon for purposes of clarity. Such details relating to the particular elements and autocollimation techniques are only incidentally related to the present invention.

For example, a collimator relates to an optical system that transmits parallel rays of light, as the objective lens or telescope of a spectroscope. Condensers comprise lens or a combination of lenses that gathers and concentrates light in a specified direction. A polarimeter, to be further mentioned, is a well known instrument for measuring the orientation of polarized light or extent of polarization from a given source.

Thus far, the various elements relating to the polarimeter 14, while mentioned, have not been described. As previously mentioned, the polarimeter 14 involves the detection and measurement of the roll movement of the target device 16 and will be described separately in connection with FIG. 3. As is well known, roll involves the revolving, turning around or movement of a body about its longitudinal axis.

Referring to FIG. 3, the half shade polarimetry technique is employed in which the system utilizes the fact that the human eye is more sensitive to slight differences in brightness of two juxtaposed half fields than to small changes of brightness in one field.

In FIG. 3, the generation of the light beam 18 and transmission to the target device 16 is the same as that described in connection with FIG. 2 relating to the pitch and yaw functions. As described in connection with FIG. 2, the reflected light beam 18 is used to detect the pitch and yaw functions. This portion of the description will be repeated.

Figure 4:
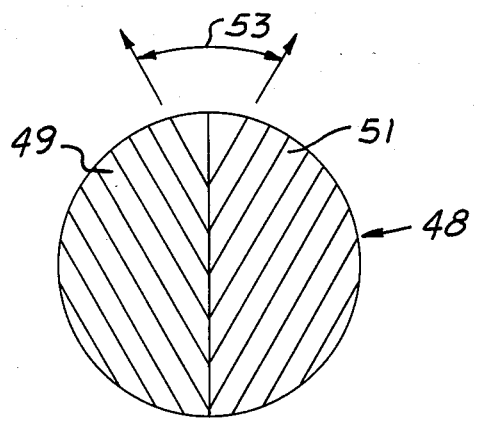
FIG. 4 is a front view representing a half shade plate analyzer used in roll measurement detection.

The front face of the target device 16, which actually may be part of a housing in an actual embodiment, includes an uncoated portion 40 within the area covered by the reflective or silvered coating 30. The diameter of this circular uncoated surface 40 may be in the order of 1 inch in diameter whereas the circular reflective portion 30 may be 2 inches in diameter. Part of the light beam 18 is transmitted through the uncoated zone 40, where it is diverted by prism means within the target device 16 to a beam 42 which is again diverted or reflected by prism means within the target device 16 and applied to a plane polarizing coating 44 on the front surface of the target 16. The polarized light beam 46 from the plane polarizing coating 44 returns to the transceiver 10, where it is directed to a "half shade" analyzer element 48 within the polarimeter 14 of the transceiver 10 (FIG. 1). The half shade analyzer 48 is also illustrated in FIG. 4.

The half shade analyzer element 48 comprises a bifurcated analyzing element divided into two halves 49 and 51. As indicated, the polarization axes of the two halves 49 and 51 are slightly tilted with respect to each other at an angle 53, as illustrated in FIG. 4. The loss of resolution otherwise produced by small imperfections in polaroid material used in the analyzer 48 or in the surface 44 is largely obviated by the design illustrated, since the polaroids are not utilized in a "crossed" or null configuration.

Figure 5:
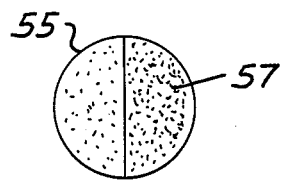
FIG. 5 represents an image passing through the analyzer plate of FIG. 4 during a roll measurement detection.

If the target device 16 is perfectly aligned with respect to the transceiver about the roll axis, then each of the two halves 49 and 51 of the analyzer element 48 transmit an equal light intensity. If a roll displacement is present, one half of the analyzer 48 will transmit a more intense beam than the other half. An observer looking through the eyepiece 38 will view the image somewhat like the one generally illustrated in FIG. 5, as will be described. In FIG. 5, if the right half 49 transmits more light than the half 51 it will produce a brighter half image 55, while the half 51 produces a dimmer half image 57. The reverse condition is also true. If equal light is transmitted through both halves 49 and 51 of the analyzer 48, each half will appear of equal intensity and an operator will be able to detect that no roll has taken place in the target device 16.

The light beam 50 from the analyzer 48 is transmitted through a lens 52 through an opening in a field stop member 54 to another lens 56. The light beam from the lens 56 is transmitted to a mirror 58 where it is reflected to a flip mirror 60, which is adapted to be manually inserted into the system during roll measurements. Normally, the flip mirror 60 is manually moved out of the path of the beam of light by a lever or other mechanism in the transceiver during the yaw and pitch measurements.

The image from the flip mirror 60 is transmitted through the eye piece 38 where it may be viewed by an observer.

If any relative rotation between the transceiver 10 and the target device 16 occurs about the roll axis, an intensity unbalance will be observed between left and right segments of the field observed by an operator since the lens combination 52 and 56 images the analyzer 48 at the focal plane of the eyepiece 38. When this occurs, the operator utilizes the analyzer null adjustment device to manually rotate the half shade plate 48 until an intensity balance is restored between the two half fields. An indicator 62 may be employed to assist in the manual balancing by measuring the magnitude and polarity of rotation of the element 48 required to bring the element to a null position thereby permitting a reading of the amount of roll involved. After the balance is restored and both halves 49 and 51 of the analyzer element 48 are transmitting light of equal intensities, the operator simply reads out the magnitude and sense of roll error from the analyzer null adjustment indicator.

Figure 6:
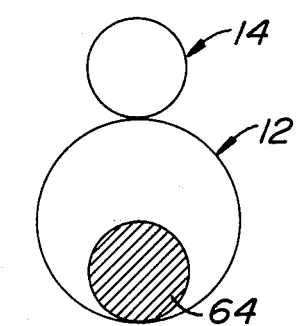
FIG. 6 illustrates a front view of the transceiver aperture.

Referring to FIG. 6, a front view of the transceiver apertures are illustrated. The aperture of the autocollimator 12 may be in the order of 2 inches in diameter and it is this part which is used to measure the pitch and yaw functions. While the two inch diameter is used for the yaw and pitch functions, only a portion of this light is used by the polarimeter 14. The portion of autocollimator beam utilized by the polarimeter 14 is illustrated by a section 64 which may be one inch in diameter. The polarimeter 14 illustrated in the top position may be on the order of one inch in diameter. The polarimeter 14 as indicated is used to measure the roll function at the target.

Figure 7:
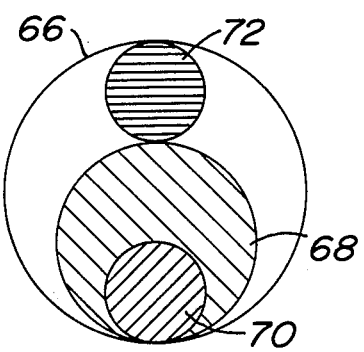
FIG. 7 illustrates a front view of the target device or module.

Referring to FIG. 7, the front view of the target device 16 is illustrated. The manner in which the front surface of the target device 16, which may be three inches in diameter, is divided is illustrated. The line 66 represents the outside diameter of the target 16. The section 68 represent the autocollimator beam. The section 70 represents the polarimeter entrance aperture which represents the uncoated surface area of the target device 16. The section 72 represents the polarimeter exit aperture with a polarizing film deposited thereon. This may be one inch in diameter.

In the event that the sensor or system illustrated is to be used in an environment where an extremely high level of DC background radiation exists, for example, outdoors in bright sunlight, where no baffling is feasible, then two further adaptations of the design illustrated are feasible. First a helium neon laser source to replace the wide band tungsten source of light may be employed. The monochromatic laser source, when used in conjunction with a narrow band spectral filter at the eyepiece, permits excellent rejection of wide band background illumination levels.

In applications where the laser source is undesirable, use of a modulated light emitting diode, for example, a gallium arsenide, in conjunction with a split field silicon photodetector located immediately to the rear of the half shade plate analyzer, permits efficient rejection of the high levels of DC background radiation. In this version, the extremely simple processing electronics, for example, preamplifiers, demodulator filter circuits, and the like, are easily packaged in the now vacant space previously occupied by the polarimeter optics downstream from the half shade plate. In a similar manner, the pitch and yaw functions may be automated by locating a silicon two-axis position-sensing detector at the plane of the eyepiece reticle; in this event, the entire sensor may be operated independent of human operators, with either open-loop electronic readout, or as part of a closed-loop system.

Figure 8:
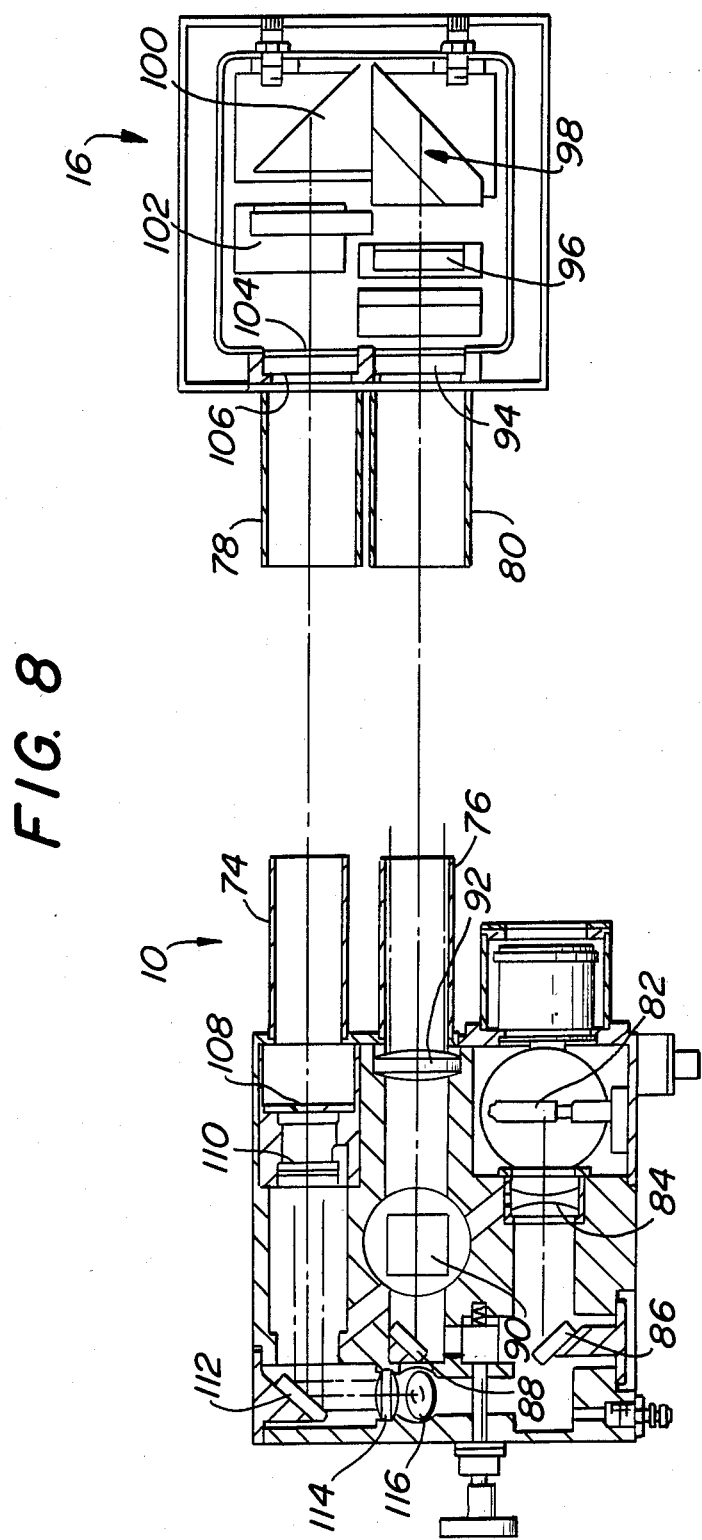
FIG. 8 is a cross-sectional view of a transceiver and a target device illustrating the compactness of the housings involved for holding the various components illustrated in FIGS. 2 and 3.

Referring to FIG. 8, an actual embodiment of the present invention is illustrated. The transceiver unit 10 is illustrated on the left and the target device 16 is illustrated on the right. The transceiver unit 10 is a relatively compact unit and may be dimensioned approximately 6×6 inches. The target element 16 may be of somewhat smaller size. The various elements illustrated in FIGS. 2 and 3 are incorporated into the units 10 and 16 illustrated in FIG. 8. However, all of the units illustrated in FIGS. 2 and 3 are not reproduced or shown in the views illustrating the actual embodiment of the invention.

The purpose in showing the actual embodiment of the invention is to illustrate the compactness of the design involved and not necessarily to reshow all of the elements previously illustrated and described. The units 10 and 16 are shown in relative alignment with respect to each other which would be the normal positions of the units prior to any actual measurements of yaw, pitch, or roll.

As previously mentioned, the target device 16 is adapted to be connected to an object, the angular positions of which are desired to be detected. The units may be relatively far apart, in the order of several hundred feet (assuming use of a laser source) and the distance requirement is not critical and dependent upon the amount of power utilized to generate the light beams involved in the measurements. Because the actual embodiment may involve more or less elements and may be slightly different in forms than those illustrated in FIGS. 2 and 3, different reference numbers are used in most cases in FIG. 8 to avoid confusion.

The transceiver 10 is included in a suitable housing and includes cylindrical light-baffle member 74 and 76 in alignment with shade elements 78 and 80 of the target device 16. The beam of light (such as the beam of light 18 in FIGS. 1 and 2) is transmitted to the target device 16, through an atmospheric sealing window 94, to a partially-reflecting window 96, which reflects a portion of the incident beam back to the autocollimator. This is the function previously described for determining the yaw and pitch functions.

The remainder of the energy in the beam is retrocollimated by the prism elements 98 and 100, after which it is focused by the lens 102 and passes through the polarizer 104 and the atmospheric sealing window 106. The purpose of the lens 102 is to reduce the size of the beam returned to the analyzer 110, thus enhancing the brightness (and hence the accuracy) of the roll measurement display at the transceiver eyepiece.

Light from the tungsten lamp 82 is transmitted through a lens 84 to a reflector element 86. The reflector element 86 or mirror reflects the light to another mirror 88 which passes it through a beam splitter 90 to a lens 92. A collimated beam of light is then transmitted through the space between the transceiver 10 and the target device 16, and picked up by the target device 16.

A window 94 permits the target device to be atmospherically sealed and purged with dry nitrogen. A small fraction of light in the collimated beam reflects from the front surface of plate 96, and returns to the transceiver lens 92 and beam splitter 90, and thence through the various lenses, reticle and eyepiece 38 illustrated in FIGS. 2 and 3, but not in cross-sectional view of FIG. 8. Yaw and pitch detection and measurement may then be achieved by an operator in a manner previously described.

The remainder of the light passes through plate 96, and is defected by the roof prism 98 to the right angle prism 100, which again deflects the light and causes it to be reflected back through a lens 102, a polaroid sheet 104, and a sealing window 106. The plane-polarized beam is then transmitted through the space between the target device 16 and the transceiver 10, and is then used to detect the roll measurement previously described. The beam from the target 16 passes through a sealing window 108 to the half shade analyzer 110, which may be the analyzer element 48 described in connection with FIG. 3. This beam is then transmitted to the flat mirror 112 where it is reflected to a relay lens 114. The light from the lens 114 is directed to the mirror 116. The light from the mirror 116 is then directed through an additional fold mirror and field stop not illustrated in the cross-sectional view of FIG. 8. A flip mirror, not illustrated, such as the mirror 60 of FIG. 3, may then be selectively inserted to direct the polarimeter beam to the eyepiece, in order to view the data relating to the roll function.

Various elements previously illustrated and described are not shown in FIG. 8. For example, the optical viewer, the manual controls, reticle, and the various other means for adjusting the polaroid elements involved are not shown. It is believed that these features are a matter of mechanical design and may take a wide variety of different forms, and are, therefore, not directly related to the present invention.

The basic elements of the invention have been illustrated and described in connection with FIGS. 2 and 3. FIG. 8 has been illustrated merely to show the relative compactness of the devices involved and thereby illustrate the portability of the unit involved and the convenience of handling.

What is claimed is:

1. A three axis sensor for sensing the angular position of a remote body in combination with a transceiver transmitting and receiving light beam signals and a target unit, the whole comprising:
   (a) a target device adapted to be aligned with said transceiver for attachment to said remote body for receiving and reflecting a light beam from and to said transceiver;
   (b) said target device including a reflective surface for receiving and reflecting said light beam to and from said autocollimator, an uncoated surface to permit a portion of said light beam transmitted from said autocollimator to pass therethrough, and a polarized surface polarized in a single plane;
   (c) prism means within said target device for receiving the portion of said light beam passing through said uncoated surface and transmitting it to said polarized surface to produce a polarized light beam for transmission to said polarimeter;
   (d) pitch and yaw detection means in said transceiver for receiving and examining the light beam reflected from said reflective surface to detect pitch and yaw variations in said target device;
   (e) roll detection means in said transceiver for receiving and examining said polarized light beam from said polarized surface to detect roll variations in said target device;
   (f) said roll detection means including a bifurcated analyzing element disposed in the path of said polarized light, said bifurcated analyzing element having contiguous first and second halves whose surfaces have polarization axes tilted with respect to each other whereby equal amounts of light pass through said surfaces when said bifurcated analyzing element is in a null position and different amounts of light pass through said surfaces when a roll movement of said target device with respect to said polarimeter is present; and
   (g) null adjustment means for rotating said bifurcated analyzing element to a null position to detect the magnitude of roll of said target device with respect to said transceiver.

2. A combination as set forth in claim 1 wherein said portion of said light beam received by said prism means is deflected and retrocollimated thereby prior to transmission to said polarized surface to produce said polarized light beam.

3. A combination as set forth in claim 2 wherein the light transmitting surface of said autocollimator and the light beam transmitted therefrom are dimensioned to substantially the same size as said reflective surface on said target device.

4. A combination as set forth in claim 3 wherein said polarized surface and said polarized light beam transmitted therefrom are dimensioned to substantially the same size as said uncoated surface and the surface of said polarimeter receiving said polarized light beam.

5. A combination as set forth in claim 4 wherein a flip mirror is adapted to be selectively inserted in the path of the light from said analyzing element to permit a roll function to be detected and measured, with said flip mirror being selectively removed from said path when pitch and yaw functions are being detected and measured.

6. A combination as set forth in claim 5 wherein a single optical viewing system including said viewer in said transceiver is connected to view operations relating to pitch, yaw and roll functions of said remote body.

* * * * *